United States Patent
Hott

[15] 3,659,871
[45] May 2, 1972

[54] PEDAL OPERATED VEHICLE
[72] Inventor: Ion V. K. Hott, Dayton, Ohio
[73] Assignee: The Joyce-Cridland Company, Dayton, Ohio
[22] Filed: Mar. 23, 1970
[21] Appl. No.: 21,866

[52] U.S. Cl..............................280/221, 280/258, 280/261
[51] Int. Cl..........................................................B62m 1/06
[58] Field of Search..................280/220, 221, 253, 258, 257, 280/255, 261, 211

[56] References Cited

UNITED STATES PATENTS

| 384,543 | 6/1888 | Price......................................280/253 |
| 446,670 | 2/1991 | Elliott....................................280/255 |
| 1,739,628 | 12/1929 | Bemont................................280/223 |
| 3,132,877 | 5/1964 | Pontin...................................280/257 |
| 3,368,823 | 2/1968 | Templeton........................280/261 X |
| 683,037 | 9/1901 | Gourny.................................280/258 |
| 1,571,562 | 2/1926 | Tingley.................................280/257 |
| 2,383,000 | 8/1945 | McLean................................280/258 |
| 626,620 | 6/1899 | Lamar...................................280/211 |
| 444,620 | 1/1891 | Rouveyre.............................280/220 |
| 2,815,222 | 12/1957 | Harrison..............................280/261 |
| 3,083,985 | 4/1963 | Young..................................280/258 |

*Primary Examiner*—Kenneth H. Betts
*Attorney*—Dybvig & Dybvig

[57] ABSTRACT

The two rear wheels of a three-wheeled vehicle are mounted on spaced axles with foot pedal operated drives located therebetween. The operator stands on the pedals and powers the vehicle with a jogging motion.

In one embodiment the pedals are mounted on lever arms pivoted forwardly of the rear wheels and drive both the rear wheels with a minimum of lost motion through one-way clutches. In another embodiment the pedals are mounted on a crank located between the rear wheels. The three-wheeled vehicles may be made primarily from standard bicycle parts.

A seat may be mounted on a post between the front and rear wheels for movement about a generally vertical and rear wheel for movement about a generally vertical axis from a usable position to an out-of-the-way position.

18 Claims, 7 Drawing Figures

Patented May 2, 1972
3,659,871
2 Sheets-Sheet 1
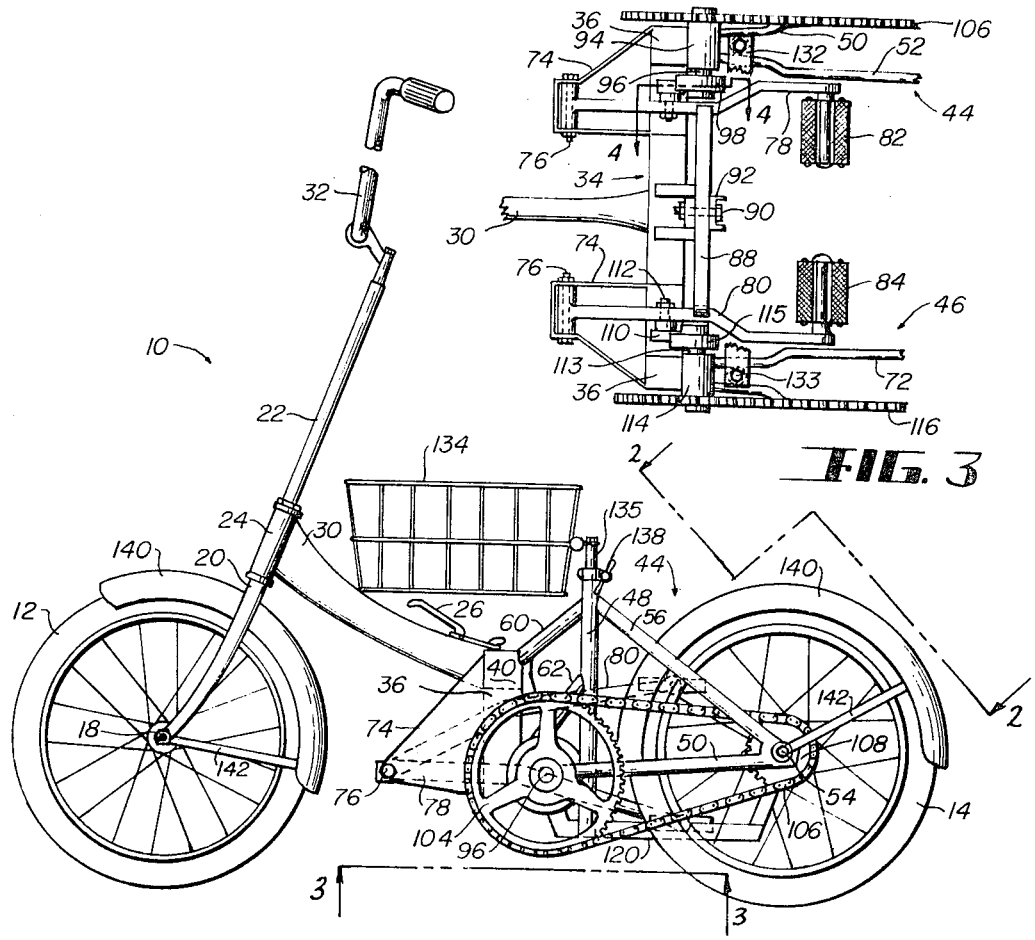
FIG. 3
FIG. 1
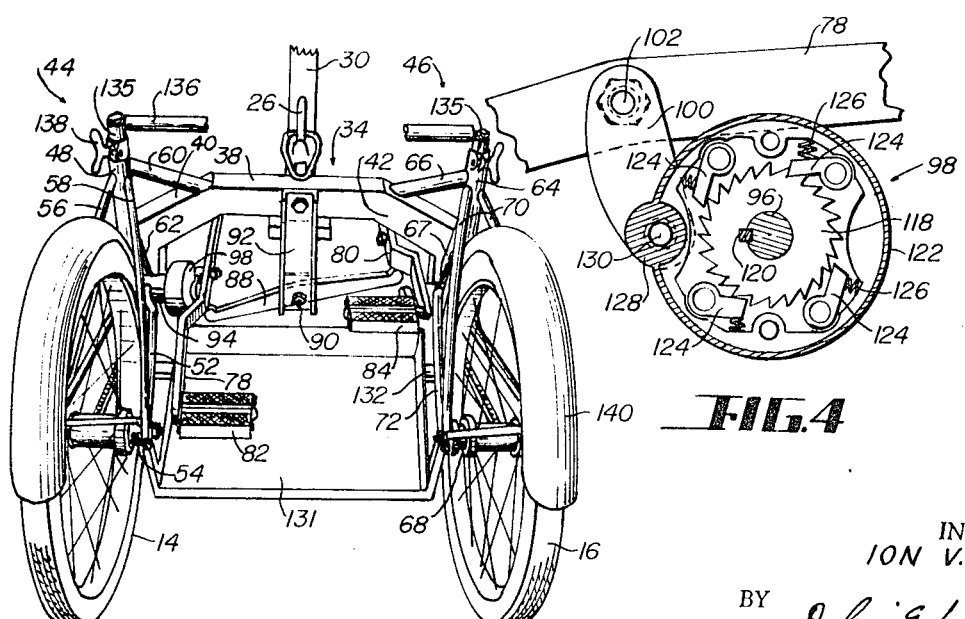
FIG. 2
FIG. 4
INVENTOR.
ION V. K. HOTT
BY Dybrig & Dybrig
HIS ATTORNEYS

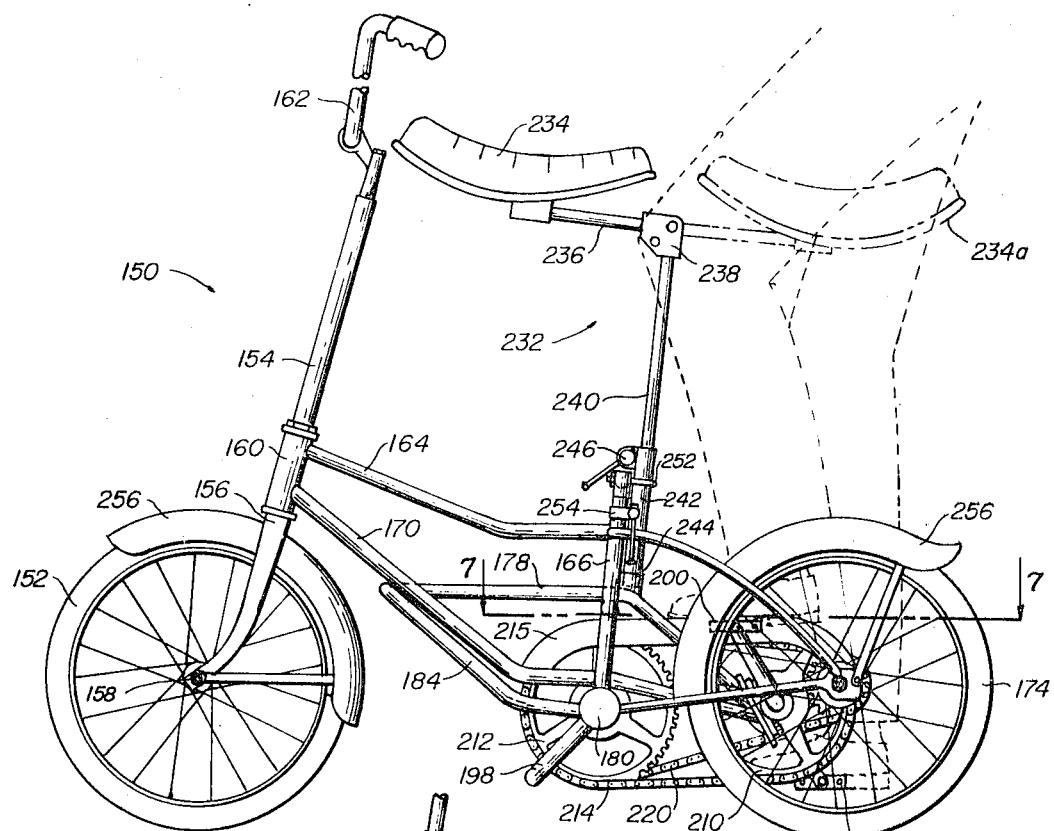

PEDAL OPERATED VEHICLE

This invention relates to foot pedal operated vehicles of the type in which the operator is in a standing position during use.

Many attempts have been made to devise practical foot pedal operated vehicles on which the operator stands. However, none have been successful, probably because of the expense of prior designs and because the operator of such devices is forced to occupy an unnatural, awkward and unstable position.

This invention provides foot pedal operated vehicles on which the operator can stand in a stable position with his feet located primarily between the rear wheels of the vehicle. For this purpose the rear wheels are mounted on spaced axles, rather than on a common axle, in order to provide room for the operator's feet and the pedal operated drive mechanism. As a result the vehicle can be reasonably compact yet the operator's feet and legs are located remote from the steering mechanism and the center of gravity of the operator is as low as feasible. The vehicles are powered by movement of the operator's feet in a type of jogging movement. The vehicles of this invention, therefore, provide beneficial exercise as well as transportation.

It is the primary object of this invention to provide an improved pedal operated vehicle of the type on which the operator is in a standing position during use. A further object is to provide such a vehicle made primarily from standard bicycle parts. The use of standard parts provides economies in both manufacture and repair. Another object is to provide such a vehicle with an optionally usable seat. Still another object is to provide a drive having one-way clutches operating with a minimum of lost motion.

Other objects will become apparent from the following description and the drawings in which:

FIG. 1 is a side elevational view of an embodiment of a pedal operated vehicle made in accordance with this invention;

FIG. 2 is a perspective view of a portion of the vehicle of FIG. 1 as viewed in the direction of the arrows 2—2 of FIG. 1;

FIG. 3 is a plan view, with parts omitted, looking upwardly from the underside of the vehicle substantially along the length thereof between the arrows 3—3 of FIG. 1;

FIG. 4 is a cross sectional view of a portion of a drive for one of the rear wheels of the vehicle taken along line 4—4 of FIG. 3;

FIG. 5 is a side elevational view of a second embodiment of a pedal operated vehicle in accordance with this invention;

FIG. 6 is a perspective view with parts broken away of the vehicle of FIG. 5; and FIG. 7 is a cross sectional view of a portion of the vehicle taken along line 5—5 of FIG. 5 illustrating in plan view the drive train thereof.

Referring to the drawings in greater detail and especially FIGS. 1 to 4, an embodiment of a vehicle made in accordance with this invention is generally designated 10 and includes a front wheel 12 and two rear wheels, a left rear wheel 14 and a right rear wheel 16. Attached to the front axle 18 is a conventional steering fork 20 which is connected to a generally upwardly and rearwardly extending steering shaft 22 received in a bearing 24 mounted on the front end of a central, longitudinal frame member 30. Affixed to the top of the steering shaft 22 is a handlebar 32. The parts thus far described will be recognized as conventional bicycle parts. However, the steering shaft 22 and the handlebar 32 are sufficiently long that a person can conveniently grip the handlebar 32 while standing on the vehicle.

Approximately midway between the front wheel 12 and the rear wheels 14 and 16, a transverse frame member 34 is provided affixed to the trailing end of the longitudinal frame member 30. The two frame members 30 and 34 may be welded together but, for rapid disassembly, an over-center clamp 26 of conventional construction is shown. Because the clamp 26 is an optional feature, and its construction is well known, it is not described in detail herein. The transverse frame member 34 is in the form of an inverted U-shape and has substantially vertical side portions 36 connected to a horizontal center portion 38 by sloping intermediate portions 40 and 42. Connected to the transverse frame member 34 are a pair of rear wheel frame assemblies, generally designated 44 and 46, the frame assembly 44 being associated with the left rear wheel 14 and the frame assembly 46 being associated with the right rear wheel 16. The frame assemblies 44 and 46 may be identical. Therefore, a side elevational view similar to FIG. 1 but viewed from the opposite side of the vehicle 10 would be a mirror image of FIG. 1, the drives for the rear wheels 14 and 16 also being identical as will be further described below.

The left rear wheel frame assembly 44 includes a vertical frame post 48 located just in advance of the rear wheel 14, a generally horizontal, lower fork comprising a pair of fork arms 50 and 52 extending from the lower end of the vertical frame post 48 in straddling relation to the rear wheel 14 to the axle 54 of the left rear wheel 14, and a pair of upper fork arms 56 and 58 connected between the upper end of the vertical frame post 48 and the rearward end of the fork arms 50 and 52. The frame assembly 44 is connected to the transverse frame member 34 by an upper bracket 60 and a lower bracket 62. It will be noted in FIG. 2 that the right hand frame assembly 46 also includes a vertical frame post designated 64 connected to the transverse frame member 34 by an upper bracket 66 and a lower bracket 67, the vertical post 64 being connected to the rear axle, designated 68, of the rear wheel 16 by upper and lower yokes 70 and 72. The several frame parts, such as the upright posts 48 and 64, are preferably made from hollow metal tubing. Those familiar with bicycle constructions will recognize that each of the illustrated rear wheel frame assemblies 44 and 46 are conventional in the manufacture of bicycles.

The rear wheel frame assemblies 44 and 46 are so constructed that the rear axles 54 and 68 are coaxial. Because they are separately supported by the axles 54 and 68, there is adequate space between the rear wheels 14 and 16 for a pedal operated drive assembly which will now be described. Projecting forwardly from the transverse frame member 34 are a pair of sheet metal frame pieces 74 (FIGS. 1 and 3) which support pivot pins 76 for rearwardly extending left and right side lever arms 78 and 80, respectively. Pivotal on the rearmost ends of the lever arms 78 and 80 are foot pedals 82 and 84. The lever arms 78 and 80 are spaced close to the adjacent rear wheels 14 and 16, respectively, whereupon the pedals 82 and 84 are mounted on axles (not shown) projecting toward one another. A transverse treadle arm 88 is pivoted at 90 to a support plate 92 affixed to the center of the transverse frame member 34 and projecting downwardly therefrom. The ends of the treadle arm 88 are located beneath the lever arms 78 and 80. Accordingly, as the left side pedal 82 is depressed the treadle arm 88 is rotated in a counterclockwise direction as viewed in FIG. 2 causing the opposite end of the treadle arm 88 to be raised, thereby raising the right side lever 80 and its foot pedal 84. Similarly, depression of the right side foot pedal 84 causes the left side foot pedal 82 to be raised.

Both of the lever arms 78 and 80 are drivingly connected to their associated rear wheels 14 and 16. Thus, a sleeve 94 is affixed as by welding to the rear wheel frame assembly 44. Mounted within the sleeve 94 is a drive shaft 96 driven through a one-way clutch, generally designated 98, by a link 100 pivoted by a pin 102 to the lever 78. In FIG. 1 the drive shaft 96 is shown connected to a coaxial drive sprocket 104 connected by a chain 106 to a driven sprocket 108 which in turn is drivingly connected and coaxial to the rear axle 54. To avoid the lost motion typical in freewheeling bicycle clutches, the driven sprocket 108 is directly connected to the rear axle 54. A link 110 is also connected by a pin 112 to the right hand lever 80 for driving a shaft 113 journalled in a sleeve 114 through a one-way clutch 115 that is connected by sprockets and a drive chain 116 to the rear wheel 16. The clutch 115 is identical to the clutch 98, which will now be described.

Referring to FIG. 4, the one-way clutch 98 includes a gear 118 affixed to the drive shaft 96 as by a key 120. The clutch 98 includes a housing 122 which is rotatably mounted on the drive shaft 96 and which houses four drive pawls 124 biased by springs 126 into engagement with the teeth of the gear 118. Affixed to or integral with the housing 122 is a sleeve 128 which rotatably receives a drive pin 130 affixed to the drive link 100. The drive pawls 124 are so arranged with respect to the gear 118 that the gear 118 is free to rotate in a counterclockwise direction as viewed in FIG. 3, the drive pawls 124 merely being cammed out of the notches between the gear teeth against the bias of the springs 126. As should be apparent from an inspection of FIG. 4, movement of the drive link 100 downwardly will result in a counterclockwise rotation of the gear 118 and accordingly the drive shaft 96.

Those familiar with one-way clutches will appreciate that only one drive pawl 124 would be required for operation of the clutch 98. However, there would occasionally be considerable lost motion in the movement of the lever arm 78 before a single drive pawl 124 would drivingly engage in a notch of the gear 118. Four drive pawls 124 are utilized so that, at most, the lost motion would be only one-fourth of the pitch of the teeth. The drive pawls 124 are, accordingly, circumferentially spaced about the gear 118 to minimize the lost motion. The spacing is such that the circumferential distance between the point of engagement of the free end of one of the pawls 124 and an adjacent pawl 124 is equal to one-fourth the circumference of an imaginary circle containing the tooth engaging ends of the pawls 124 plus or minus one-fourth the pitch of the teeth of the gear 118.

In operation, one standing on the pedals 82 and 84 may propel the vehicle 10 by depressing the uppermost of the two pedals 82 and 84, thereby driving the adjacent rear wheel on the down stroke of that pedal. As already explained, the down stroke of one of the pedals 82 or 84 causes the other pedal 82 or 84 to be raised. By virtue of the over-running clutches 98 and 115, the rear wheel which is not being driven simply runs freely. Subsequent depression of the other petal will then drive the previously free running rear wheel. The levers 78 and 80 are pivoted by the pins 76 on a common horizontal transverse axis which is lower than the wheel axles. Accordingly, the pedals 82 and 84 oscillate from a point lower than the rear wheel axles. As shown in FIG. 1, the pedals 82 and 84 move a slightly greater distance below than above the plane containing the wheel axles. Also, the pedals 82 and 84 are, as illustrated, spaced slightly forwardly of the rear wheel axles yet sufficiently rearwardly of the steering shaft 22 and between the rear wheels so that one standing on the pedals 82 and 84 can conveniently rest the upper portion of his body on the handlebar 32 while operating the vehicle.

To provide added support for the feet, a platform 131 is suspended from the inside of the axles 54 and 68 and supported by a transversely extending strap 132 attached by bolts 133 to the bottom of the upright frame posts 48 and 64. Thus, the operator may temporarily rest part of his lowermost foot on the platform 131 while not pedaling. Because the operator is supported between the front and rear wheel axles with his feet occupying an average position slightly lower than the horizontal plane containing the axles, he is in a comfortable and stable position.

A bicycle basket 134 can conveniently be mounted forwardly of the upright frame members 48 and 64 over the transverse frame member 34 with the forward edge of the basket 134 resting upon the longitudinal frame member 30. A support for the basket 134 can conveniently be provided by a pair of posts 135 received within the hollow centers of the upright frame members 48 and 64, the posts 135 being connected by a transverse support rod or utility bar 136 to which the basket 134 may be welded. Clamps 138 may be used to maintain the desired height of the posts 135 in the frame members 48 and 64. The wheels 12, 14 and 16 can be covered by conventional fenders 140 mounted by brackets 142 on the wheel axles. Also conventional chain guards (not shown) could shield the drive chains. By virtue of the construction illustrated, most of the parts of the vehicle described above can be made from conventional bicycle parts. Substantially the only special parts required are the transverse frame member 34 and the drive assemblies from the pedals 82 and 84 to the drive sprockets.

In the embodiment of the pedal operated vehicle described above, the movement of the operator closely approximates the movement when one "jogs" for exercise. By virtue of the minimum lost motion in each of the rear wheel drives, the vehicle is thrust forwardly upon each downstroke of each of the pedals 82 and 84. FIGS. 5, 6 and 7 show another embodiment of this invention which, because it employs a more conventional and simpler drive mechanism, is somewhat cheaper than the embodiment described above. It too is powered by a person in an upright position moving his legs in a movement similar to a jogging movement. However, power is applied to only one of the rear wheels by a drive assembly which operates in a manner similar to an ordinary bicycle drive.

The foot pedal operated vehicle of FIGS. 5, 6 and 7 is generally designated 150 and includes a front wheel 152 with a forwardly and rearwardly extending steering shaft 154 having a fork 156 supported by the front axle 158. The steering shaft 154 is journalled in a bearing 160 and is rotated by a handlebar 162 for steering the vehicle. The bearing 160 is connected to a frame including an upper, rearwardly extending U-shaped frame member 164 welded at its center forwardmost end to the bearing 160 and connected at its rear ends to generally vertical and centrally located upright frame posts 166 and 168. The frame further includes a center frame assembly including a longitudinally extending frame member 170 connected at its forward end to the bearing 160 and connected at its rearward end to a bearing housing 172 located between spaced left and right rear wheels designated 174 and 176, respectively. The center frame assembly further includes a brace frame member 178 connected at its forward end to an intermediate portion of the longitudinal frame member 170 and at its rearward end to the bearing housing 172. Mounted to the bottom ends of the frame posts 166 and 168 are a pair of transversely extending coaxial tubes 180 and 182, each of which extend substantially half the distance between the two wheels 174 and 176. The frame also includes a rearwardly extending lower frame member 184 connected to the underside of the longitudinal frame member 170. The frame member 184 is also generally U-shaped with its rearward ends welded respectively to the two tubes 180 and 182. The frame is supported on the left and right rear axles, designated 186 and 188, of the rear wheels 174 and 176, respectively, by left and right rear wheel frame assemblies 190 and 192 including upper forks 194 connected to the support posts 166 and 168 and lower forks 196 connected to the tubes 180 and 182.

A transverse frame assembly rigidly interconnecting the rear wheel frame assemblies includes the tubes 180 and 182, the free ends of which are connected together by a depending U-shaped brace 198, and by a transversely extending horizontal frame member 200 connected between the upright frame posts 166 and 168. The transverse frame member 200 extends under the center brace 178 to which it may be welded. Further to support the tubes 180 and 182, they are connected adjacent their inner ends to the transverse frame member 200 by vertical frame members 201. In addition, the tube 182 is connected to the center frame member 170 by a brace 202.

The vehicle 150 is powered in a manner similar to a conventional bicycle and for this purpose includes a crank 204 journalled for rotation in the bearing housing 172 about a transverse axis parallel to the rear wheel axles 186 and 188. Foot pedals 206 and 208 are rotatably mounted on the ends of the crank 204. The crank 204 is directly connected to a drive sprocket 210 that drives a first intermediate sprocket 212 through a chain 214 which may be shielded by a chain protector 215. The intermediate sprocket 212 is fastened to and coaxial with a drive shaft 216 journalled in the tube 182. For this reason the tube 182 may be referred to as a drive tube.

The drive shaft 216 extends from the transverse centerline of the vehicle 150 to the right side of the vehicle where it is fastened to a second intermediate and coaxial sprocket 218 drivingly connected by a second drive chain 220 to a driven sprocket 222 mounted for rotation on the right side rear axle 188. The driven sprocket 222 is drivingly connected by a conventional freewheeling clutch drive member 224 to the rear axle 188.

The drive sprocket 210 and the two intermediate sprockets 212 and 218 can have the same diameter and the driven sprocket 222 have a smaller diameter so that increased speed is thereby obtained. Furthermore, those skilled in the art will be aware that the drive connection between the second drive chain 220 and the driven sprocket 222 could incorporate a conventional speed or gear change device so that various gear ratios between the drive sprocket 210 and the driven sprocket 222 may thereby be obtained.

In operation, the operator stands on the pedals 206 and 208 as illustrated in phantom lines in FIG. 4 while gripping the handlebar 162 and rotates the crank 204 to propel the vehicle. The axis of rotation of the crank 204 is below the plane containing the wheel axles and spaced slightly forwardly of the rear axles 186 and 188. Accordingly, as with the embodiment described above, the operator is located in a stable position so that he may safely propel the vehicle at reasonably fast speeds.

The tension on the intermediate drive chain 214 may be adjusted by moving the bearing housing 172 fore and aft of the position shown in the drawing. For this purpose the bearing housing 172 is affixed to an adjusting plate 226 that is bolted to a mounting plate 228 affixed to the rear ends of the center frame members 170 and 178. The mounting plate 228 has a plurality of apertures therethrough for receiving mounting bolts 230 so that the position of the adjusting plate 226 with respect to the mounting plate 228 can be varied. The mounting plate 228 slopes from front to rear as shown in FIG. 4. As apparent, the adjusting plate 226 may be bolted at different places along the length of the mounting plate 228 to thereby vary the separation between the bearing housing 172 and the first intermediate sprocket 212 which rotates about the axis of the drive tube 182.

Although the vehicle 150 shown in FIGS. 5, 6 and 7 is primarily intended to be operated by a person standing on the pedals 206 and 208, a seat construction is provided as an optional feature. The seat construction is generally designated 232 and comprises a bicycle seat 234 mounted on a horizontally extending arm 236 connected by an angle brace 238 to the top of an upright support post 240, the lower end of which is received within a sleeve 242 which in turn is mounted in an upwardly opening socket 244 welded to the center brace 178 just behind the transverse frame member 200. The height of the seat 234 can be adjusted by movement of the support post 240 and the sleeve 242 and the adjusted height retained by a conventional clamp 246.

Because the seat 234 is supported on the generally horizontally extending arm 236, the seat 234 may be positioned, as illustrated in full lines in FIG. 5, between the steering shaft 154 and the support posts 166 and 168. When so located, the operator merely stands on the pedals 206 and 208 to operate the vehicle. Alternatively the support post 240 may be rotated through 180° about its axis upon release of the clamp 246, whereupon the support arm 236 projects rearwardly. The seat 234 is thereby positioned as indicated by phantom lines 234a above and centrally of the rear wheels 174 and 176. The operator, accordingly, can then sit on the seat 234 while pedaling the vehicle. Added support for the sleeve 242 is provided by a transversely extending utility bar 248 connected at its ends to depending posts 250 which are received within the hollow interior of the upright support posts 166 and 168. The free end of the sleeve 242 is held by a U-bolt 252, the legs of which extend through and are connected to the utility bar 248. The utility bar 248 may be removed by release of clamps 254 encircling the free ends of the support posts 166 and 168. A bicycle basket (not shown) could be mounted on the vehicle 150 in a manner similar to the manner in which the basket 134 is mounted upon the vehicle 10, the basket being connected to the utility bar 248.

It may be observed that the tube 180 merely serves as part of the framework. If desired, its exposed end could be provided with a removable cap and it could also serve as a small tool chest. Again fenders such as those designated 256 may be mounted on the wheel axles. Both embodiments of pedal operated vehicles described above may be provided with running lights, hand brakes and the like. The entire drive train of the vehicle 150 may use available bicycle parts and substantially all of the frame of the vehicle 150 can also be made from available parts.

It is thus seen that the objects of this invention have been met. Both embodiments of a foot pedal operated vehicle described above provide ample space between the rear wheels for an operator to conveniently manipulate the pedals. The portions of the drive mechanisms directly connected to the rear wheels are located on the outside of the wheels and driven by drive shafts located forwardly of the rear wheels in an out-of-the-way position so as not to interfere with the movements of the operator's feet. For this reason, and for the added reason that the rear wheels are on spaced axles, the drive mechanism is so positioned that the operator stands in a reasonably comfortable and stable position. Vehicles made in accordance with this invention may be operated on inclined surfaces as well as on flat surfaces and are thus capable of general use by the public.

Although the presently preferred embodiments of this invention have been described, it will be understood that various changes may be made therein within the scope of the appended claims.

Having thus described my invention, I claim:

1. A foot pedal operated vehicle including a front wheel, a pair of rear wheels, a generally upright steering shaft connected to said front wheel, a frame having a bearing at its front end supported by said steering shaft and supported at its rear end by said rear wheels, each of said rear wheels having an axle and spaced portions of said frame being supported by said axles, a pedal operated drive mechanism mounted on said frame including a pair of foot pedals located between said rear wheels and movable beneath the horizontal plane containing said axles, said axles being separated by a distance sufficient to permit the operator of the vehicle to move his feet therebetween while standing on said foot pedals to operate said drive mechanism, and motion transmitting means connecting said foot pedals to at least one of said rear wheels.

2. The apparatus of claim 1 wherein said motion transmitting means includes a driven sprocket on one of said axles, a drive sprocket rotatably mounted on said frame forwardly of said last mentioned rear wheel, a drive chain connecting said drive sprocket and said driven sprocket and means interconnecting at least one of said pedals and said drive sprocket for rotating said drive sprocket as said pedals are manipulated by the feet of an operator standing on said pedals.

3. The apparatus of claim 2 wherein said motion transmitting means further includes a drive shaft connected at one end to said drive sprocket, an intermediate drive sprocket connected to the other end of said drive shaft, said foot pedals being mounted on a crank, a crank driven sprocket connected to said crank and a drive chain drivingly connecting said crank driven sprocket and said intermediate drive sprocket.

4. The apparatus of claim 3 wherein said axles of said rear wheels are coaxial and lie in a plane substantially coplanar with the axis of rotation of said front wheel, said crank and said drive shaft being supported by said frame for rotation about axes parallel to the axis of said rear axles.

5. The apparatus of claim 4 wherein the axis of rotation of said crank is spaced forwardly from and below the axis of said axles.

6. The apparatus of claim 2 further including a second driven sprocket connected to the other of said wheels, a second drive sprocket mounted for rotation upon said frame about an axis coaxial with the axis of rotation of said first mentioned drive sprocket, a second drive chain connecting said second drive sprocket to said second driven sprocket, both of said pedals being connected separately to said first mentioned and said second drive sprockets by drive means responsive to vertical downward movement of said pedals whereby one of said rear wheels is driven by said pedals only upon downward movement of the one of said pedals immediately adjacent thereto and the other of said rear wheels being driven only upon downward movement of the other of said pedals immediately adjacent thereto.

7. The apparatus of claim 6 wherein said pedals are separately mounted upon a pair of rearwardly extending drive levers pivoted upon said frame for rotation about an axis parallel to said axles and forwardly of said drive sprockets, said drive sprockets being mounted upon drive shafts mounted for rotation upon said frame, and said apparatus further including one-way clutches coupling said levers to said drive shafts only during downward movement of the rearward ends of said levers.

8. A foot pedal operated vehicle including a front wheel, a pair of rear wheels, a generally upright steering shaft connected to said front wheel, a frame having a bearing at its front end supported by said steering shaft and supported at its rear end by said rear wheels, each of said rear wheels having an axle and spaced portions of said frame being supported by said axles, a pedal operated drive mechanism mounted on said frame including a pair of foot pedals located between said rear wheels, and motion transmitting means connecting said foot pedals to said rear wheels, said motion transmitting means including first and second driven sprockets, one on each of said axles, mutually coaxial first and second drive shafts mounted for rotation on said frame forwardly of said rear wheels, first and second drive sprockets separately mounted on said drive shafts, first and second drive chains connecting said drive sprockets to said driven sprockets, drive means separately interconnecting said pedals and said drive sprockets for rotating said drive sprockets as said pedals are manipulated by the feet of an operator standing on said pedals, said drive means including a pair of rearwardly extending drive levers pivoted upon said frame for rotation about an axis parallel to said axles and forwardly of said drive sprockets, said pedals being separately mounted upon said drive levers, and one-way clutches coupling said levers to said drive shafts only during downward movement of the rearward ends of said levers, whereby one of said rear wheels is driven by said pedals only upon downward movement of one of said pedals and the other of said rear wheels being driven only upon downward movement of the other of said pedals, and a treadle arm mounted for rotation upon said frame about the center longitudinal axis of said vehicle, intermediate portions of said levers engaging the opposite ends of said treadle arm whereupon downward movement of one of said pedals drives the other of said pedals upwardly through said treadle arm.

9. The apparatus of claim 8 further including a platform mounted beneath said pedals between said rear wheels.

10. A foot pedal operated vehicle including a front wheel, means for steering said front wheel, a pair of rear wheels, each of said wheels having an axle, a frame supported on said axles, said frame including two rear wheel frame assemblies, at least one drive shaft extending transversely of the longitudinal axis of said vehicle and mounted upon said frame between said front and said rear wheels, foot pedal operated drive means for rotating said drive shaft including foot pedals located rearwardly of said drive shaft, and a drive mechanism including a pair of sprockets adjacent one of said rear wheel frame assemblies, one of said sprockets being drivingly connected and coaxial to said drive shaft and the other of said sprockets being drivingly connected and coaxial to one of said rear wheel axles, and a drive chain connecting said pair of sprockets.

11. The apparatus of claim 10 further including a second drive shaft and a second drive mechanism including sprockets driven by said foot pedal operated drive means and drivingly connected to the other of said rear wheels, said rear wheels being straddled by said first mentioned drive mechanism and said second drive mechanism.

12. The apparatus of claim 11 wherein said foot pedal operated drive means further includes a pair of rearwardly extending levers, said foot pedals being connected to the rearward ends of said levers, means pivotally mounting the forward ends of said levers to said frame for rotation about an axis which is parallel to said drive shafts, a pair of one-way clutches, one for each of said levers, and connecting said levers to said drive shafts, and means moving the rearward end of one of said levers upwardly as the rearward end of the other of said levers is lowered by manipulation of the feet.

13. The apparatus of claim 12 wherein said last mentioned means includes a treadle arm pivotally connected to said frame between said lever arms and having opposite end portions located beneath said levers.

14. The apparatus of claim 10 wherein said foot pedal operated drive means includes a pair of foot pedals mounted on a crank, means supporting said crank upon said frame for rotation about an axis parallel to said rear wheel axles and mounting said crank between said rear wheels, a drive sprocket driven by said crank and chain connected to an intermediate sprocket mounted on said drive shaft whereby rotation of said crank by manipulation of the feet directly drives said first mentioned one of said sprockets.

15. The apparatus of claim 14 wherein said driven sprocket is connected to said one of said rear wheel axles by an overrunning clutch.

16. The apparatus of claim 10 wherein said means for steering said front wheel includes an upwardly and rearwardly extending steering shaft connected by a fork to said front wheel axle, a handlebar mounted on the top of said steering shaft, said steering shaft and said handlebar projecting a sufficient distance upwardly whereby one can conveniently grasp said handlebar while standing on said foot pedals.

17. The apparatus of claim 16 including a seat assembly comprising an upright support post, means mounting a bicycle seat on said support post with the center of said seat located remotely from the longitudinal axis of said support post, means mounting said support post on said frame for rotation about a generally vertical axis whereupon said support post may be rotated to position said seat between the normal position of a person standing on said pedals and said support post may also be rotated to a position whereat said seat is positioned between the rear wheels of said vehicle to provide a seat for a person whose feet are engaged with said pedals, and releaseable means for affixing said post in a desired position of rotation.

18. In a foot pedal operated vehicle of the type operated by one standing on foot pedals and holding on to the handlebar of the front wheel, the improvement of a seat assembly comprising an upright support post, means mounting a bicycle seat on said support post with the center of said seat located remotely from the longitudinal axis of said support post, means mounting said support post on the frame of said vehicle for rotation about a generally vertical axis whereupon said support post may be rotated to position said seat between the normal position of a person standing on said pedals and said support post may also be rotated to a position whereat said seat is positioned between the rear wheels of said vehicle to provide a seat for a person whose feet are engaged with said pedals, and releaseable means for affixing said post in a desired position of rotation.

* * * * *